(12) United States Patent
Satterfield et al.

(10) Patent No.: US 12,232,462 B2
(45) Date of Patent: Feb. 25, 2025

(54) PHOTON SOURCE FOR PROMOTING THE GROWTH AND MATURATION RATE OF MEMBERS OF THE PLANTAE AND PROTISTA KINGDOMS

(71) Applicant: AGNUITY, INC., Waxahachie, TX (US)

(72) Inventors: Craig Satterfield, Waxahachie, TX (US); Eugene Edward Wisakowsky, Waxahachie, TX (US); Ashlynn Joy Fix, Waxahachie, TX (US); Sergio Alejandro Gonzalez Ibarra, Waxahachie, TX (US)

(73) Assignee: AGNUITY, INC., Waxahachie, TX (US)

( * ) Notice: Subject to any disclaimer, the term of this patent is extended or adjusted under 35 U.S.C. 154(b) by 0 days.

(21) Appl. No.: 18/492,710

(22) Filed: Oct. 23, 2023

(65) Prior Publication Data
US 2024/0065177 A1 Feb. 29, 2024

Related U.S. Application Data

(63) Continuation of application No. PCT/US2023/068075, filed on Jun. 7, 2023.
(Continued)

(51) Int. Cl.
*A01G 7/04* (2006.01)
*A01G 9/24* (2006.01)
(Continued)

(52) U.S. Cl.
CPC .............. *A01G 7/045* (2013.01); *A01G 9/249* (2019.05); *H05B 45/325* (2020.01); *H05B 47/16* (2020.01); *H05B 47/165* (2020.01)

(58) Field of Classification Search
CPC .......... A01G 7/045; A01G 9/249; A01G 9/26; A01G 7/04; H05B 47/16; H05B 45/335;
(Continued)

(56) References Cited

U.S. PATENT DOCUMENTS

| 3,233,146 A | 2/1966 | Vacha | |
|---|---|---|---|
| 3,930,335 A * | 1/1976 | Widmayer | A01G 7/045 47/DIG. 6 |

(Continued)

FOREIGN PATENT DOCUMENTS

| JP | 02128624 | 5/1990 |
|---|---|---|
| JP | 04287618 | 10/1992 |
| WO | 2018101922 A1 | 6/2018 |

OTHER PUBLICATIONS

Sheehan, "Flashlighting Chyrsanthemums", Florida State Horticultural Society, pp. 433-436, 1961.
(Continued)

*Primary Examiner* — Jeffrey R Larsen
(74) *Attorney, Agent, or Firm* — PERKINS COIE LLP (57) ABSTRACT

A photon source for promoting the growth and maturation rate of members of the Plantae and Protista Kingdoms comprises a new luminous power source that provides the full range of light spectra by mimicking sunlight in a sunfleck (dappled) pattern by exciting xenon gas inside of an enclosed glass tube in instantaneous pulsed sequences. The micro-dose pulse penetrates the leaf strata to reach the maximum amount of photon processing pigments, provides the energy required for growth by enhancing photosynthetic plant functions, and significantly reducing production energy consumption. The pulse also allows the plant or Protista's photon processing compounds to process the photosynthesis reaction before the next flash, which allows for optimal use of the energy provided. The pulsed lighting sequences reduce energy consumption by up to 90%, and
(Continued)

this makes it an excellent application for solar, wind or other green energy power thus reducing carbon footprint and making it the future of the CEA industry.

16 Claims, 5 Drawing Sheets

Related U.S. Application Data (60) Provisional application No. 63/350,070, filed on Jun. 8, 2022, provisional application No. 63/350,075, filed on Jun. 8, 2022.

(51) Int. Cl.
*H05B 45/325* (2020.01)
*H05B 47/16* (2020.01)
*H05B 47/165* (2020.01)

(58) Field of Classification Search
CPC .... H05B 47/165; H05B 45/325; H05B 45/20; H05B 45/10; H05B 47/11
USPC ............ 47/58.1 LS, 17; 362/805, 563
See application file for complete search history.

(56) References Cited

U.S. PATENT DOCUMENTS

| | | | |
|---|---|---|---|
| 4,146,993 A | 4/1979 | Freeman | |
| 4,788,793 A | 12/1988 | Kadkade | |
| 5,012,609 A * | 5/1991 | Ignatius | A01G 7/045 47/1.01 R |
| 6,050,700 A | 4/2000 | Satterfield | |
| 6,554,439 B1 * | 4/2003 | Teicher | F21V 9/40 362/276 |
| 8,847,514 B1 * | 9/2014 | Reynoso | H05B 45/46 315/363 |
| 9,295,201 B2 | 3/2016 | Bostdorff | |
| 9,756,794 B2 | 9/2017 | Bostdorff | |
| 2004/0109302 A1 | 6/2004 | Yoneda et al. | |
| 2009/0151248 A1 | 6/2009 | Bissonnette et al. | |
| 2009/0291485 A1 | 11/2009 | Shigematsu et al. | |
| 2011/0124522 A1 * | 5/2011 | Marrs | C12P 7/06 506/10 |
| 2011/0125296 A1 * | 5/2011 | Bucove | A01G 9/249 315/294 |
| 2011/0179706 A1 * | 7/2011 | Hunt | A01G 7/045 47/58.1 LS |
| 2011/0183368 A1 | 7/2011 | Chapman et al. | |
| 2011/0310270 A1 * | 12/2011 | Gladnick | G01N 21/8806 348/E5.037 |
| 2012/0000121 A1 | 1/2012 | Swann | |
| 2012/0043907 A1 | 2/2012 | Lu et al. | |
| 2012/0252105 A1 * | 10/2012 | Ahrens | C12M 21/02 435/257.1 |
| 2015/0084524 A1 * | 3/2015 | Maxik | H05B 45/20 315/158 |
| 2015/0230409 A1 * | 8/2015 | Nicole | A01G 9/14 315/153 |
| 2016/0165811 A1 * | 6/2016 | Bostdorff | H05B 47/10 315/312 |
| 2016/0338169 A1 * | 11/2016 | Rantala | H05B 45/37 |
| 2016/0338360 A1 * | 11/2016 | Mitter | G01N 33/0098 |
| 2018/0054974 A1 * | 3/2018 | Vasilenko | H05B 45/20 |
| 2019/0082610 A1 * | 3/2019 | Speer | H05B 47/155 |
| 2019/0297784 A1 | 10/2019 | Hegde et al. | |
| 2022/0015210 A1 * | 1/2022 | Dupras | H05B 47/155 |
| 2022/0046773 A1 | 2/2022 | Dupras et al. | |
| 2022/0244184 A1 * | 8/2022 | Schaffer | G01N 21/6452 |
| 2022/0369567 A1 * | 11/2022 | Smolik | A01G 9/249 |

OTHER PUBLICATIONS

Braga, "Fun projects for the experimenter," 1 page.
Stroboscope, 1 page.

* cited by examiner

PHOTON SOURCE FOR PROMOTING THE GROWTH AND MATURATION RATE OF MEMBERS OF THE PLANTAE AND PROTISTA KINGDOMS

CROSS-REFERENCE TO RELATED APPLICATIONS

This application is a continuation of International Patent Application No. PCT/US2023/068075, filed Jun. 7, 2023, which application claims priority to U.S. 63/350,070, filed Jun. 8, 2022, and U.S. 63/350,075, filed Jun. 8, 2022, each of which is incorporated by reference herein in its entirety by this reference thereto.

FIELD

This invention relates to a photon source for promoting the growth and maturation rate of members of the Plantae and Protista Kingdoms.

BACKGROUND

Members of the Plantae and Protista Kingdoms in their natural environment require space, proper temperature, light, water, air, nutrients, and time for optimal growth.

Optimal growth may also be achieved in controlled environment agriculture (CEA) using well-known products such as irrigation systems, heating and cooling systems, fertilizer, humidifiers, and artificial grow lights. Advantageously, products such as automatic watering systems and artificial grow lights may optimize plant growth in settings such as a greenhouse resulting in faster plant growth, as well as increased nutrition consumption and flower production.

Consumer demand for fresh fruits, vegetables, and horticultural crops produced in CEA is growing at a compounded rate of >20%. The growth of CEA is confronted with two major issues:

High production cost; and
A growing carbon footprint.

Precise process control, for example providing additional light throughout the growing season, is a major CEA requirement to ensure a successful harvest. Without added light, the success of CEA is dependent on nature. Variations in weather and the changing of seasons can wreak havoc on the production schedule of CEA crops. To try and stabilize this important critical growing variable, the industry has adapted various lighting methods over the past 50 years but such approaches have required large amounts of energy demand which has created a large carbon footprint for the CEA industry.

There is a continuing need for a lighting system that is user-friendly, modular, adaptable, and customizable, that stimulates optimal growth of members of the Plantae and Protista Kingdoms, and that reduces the carbon footprint of such systems by minimizing energy usage.

SUMMARY

Embodiments of the invention provide a photon source for promoting the growth and maturation rate of members of the Plantae and Protista Kingdoms. In embodiments of the invention, a new luminous photon source provides the full range of electromagnetic spectra by mimicking sunlight in a sunfleck (dappled) pattern by exciting xenon gas inside of an enclosed glass tube in instantaneous pulsed sequences, referred to herein as micro-doses. The pulse penetrates the leaf strata and provides the energy required for growth by enhancing photosynthetic plant functions and greatly reducing production energy consumption. The pulse also allows the plant to process the photosynthesis reaction before the next flash. The pulsed lighting sequences reduce energy consumption by up to 90%, making it an excellent application for use with a solar power source, thus reducing carbon footprint.

DETAILED DESCRIPTION

Embodiments of the invention provide a photon source for promoting the growth and maturation rate of members of the Plantae and Protista Kingdoms in which the photon source comprises a strobe and grow light system. In particular embodiments, the members of the Plantae and Protista Kingdoms may include any vegetable plant, fruit-bearing plant, ornamentals, or any species that falls under the Plantae and Protista Kingdoms of taxonomy. It should be understood that other types of members of the Plantae and Protista Kingdoms may also be cultivated using the system, as desired.

As discussed herein, the photon source may comprise a pulsed light source such as a strobe or it may comprise both the pulsed light source and a grow light. While FIGS. 1-5 show a combined pulsed light source and grow light, some embodiments of the invention comprise only a pulsed light source. Significantly, the pulsed light source generates micro-doses of photons that promote the growth and maturation rate of members of the Plantae and Protista Kingdoms, as discussed in detail below. The grow light can be provided to complement the effect of the pulsed photon source by supplementing available light or providing light for plant growth, as discussed in detail below.

Figure 1:
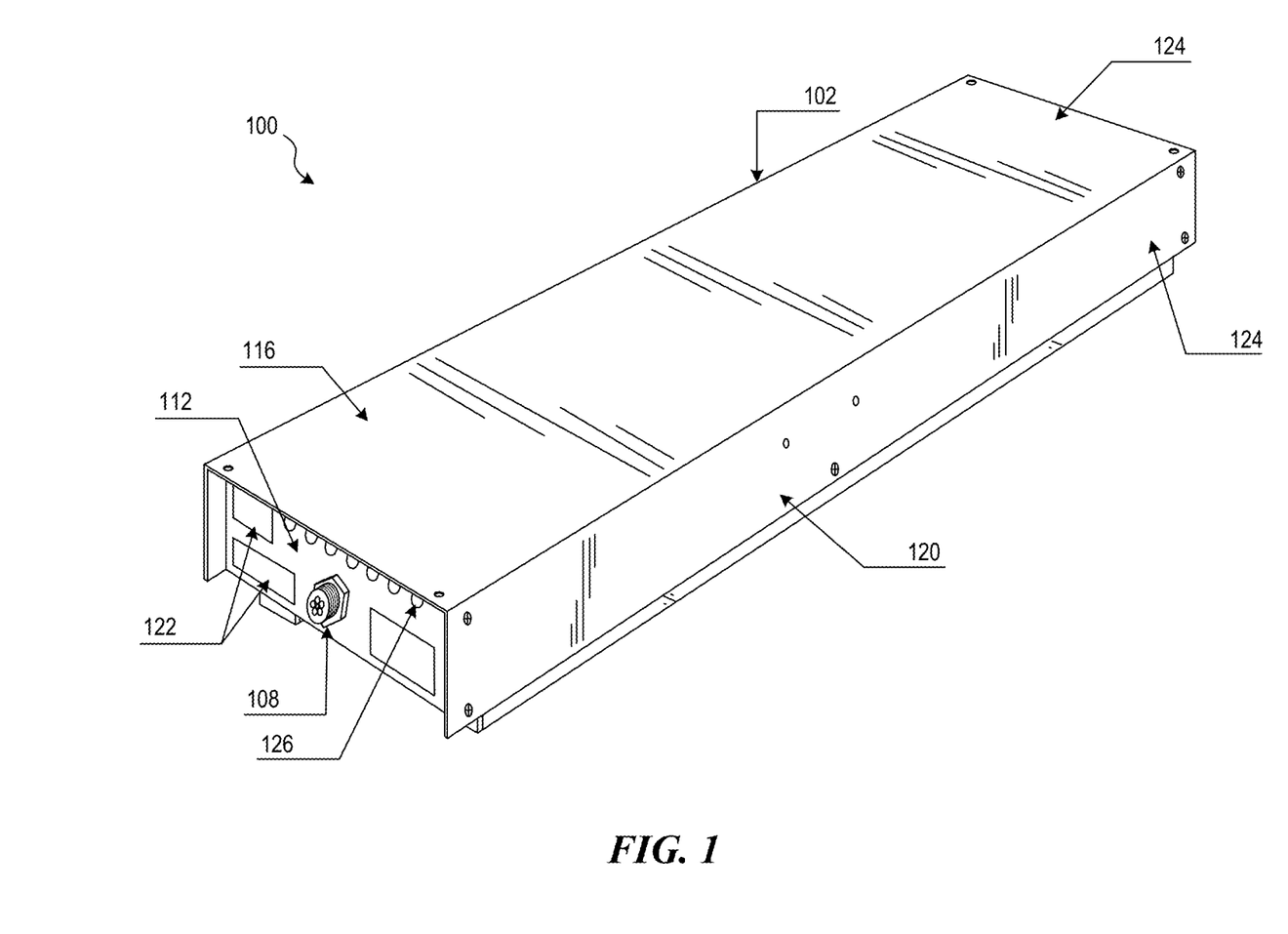
FIG. 1 is a top perspective view of a photon source for promoting the growth and maturation rate of members of the Plantae and Protista Kingdoms according to an embodiment of the invention.
Figure 2:
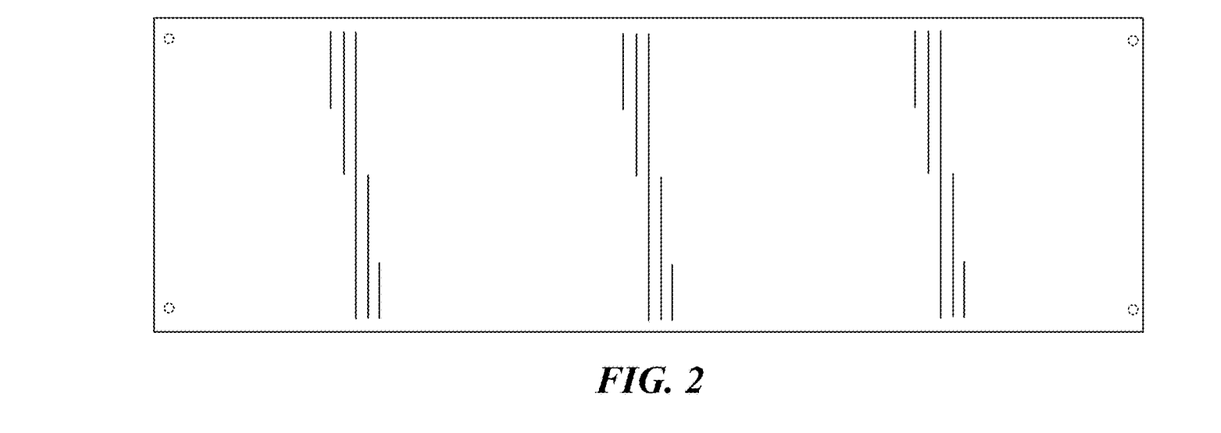
FIG. 2 is a top-plan view of the photon source for promoting the growth and maturation rate of members of the Plantae and Protista Kingdoms of FIG. 1 according to an embodiment of the invention.
Figure 3:
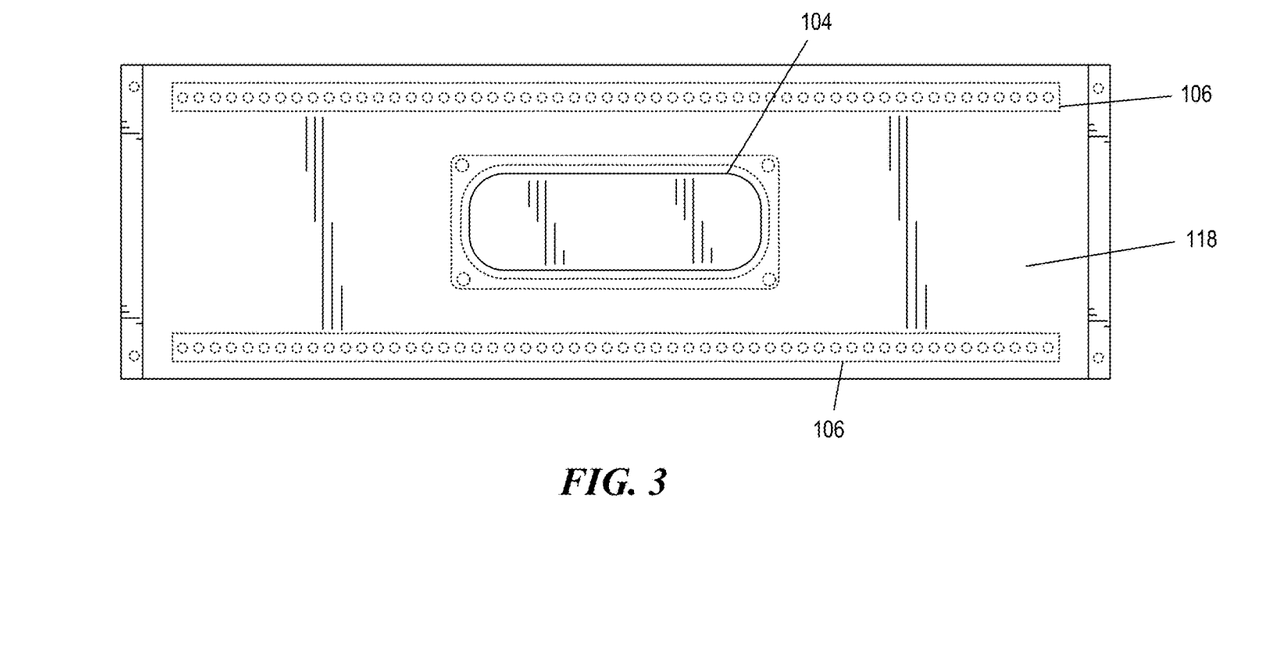
FIG. 3 is a bottom plan view of the photon source for promoting the growth and maturation rate of members of the Plantae and Protista Kingdoms of FIG. 1 according to an embodiment of the invention.
Figure 4:
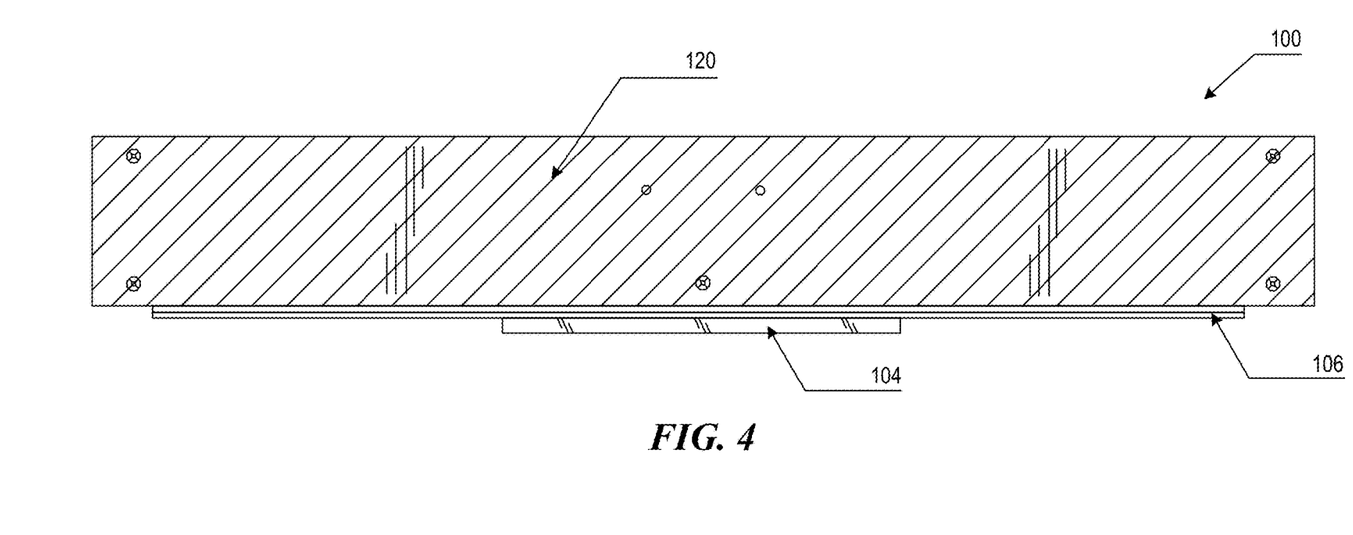
FIG. 4 is a right-side elevational view of the photon source for promoting the growth and maturation rate of members of the Plantae and Protista Kingdoms of FIG. 1 according to an embodiment of the invention.
Figure 5:
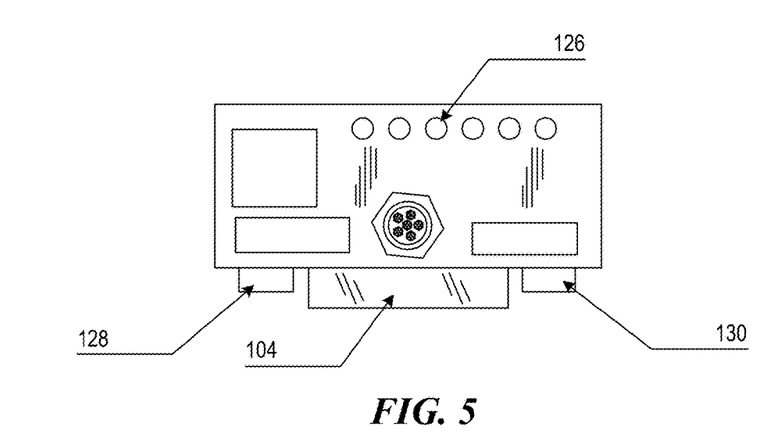
FIG. 5 is a front elevational view of the photon source for promoting the growth and maturation rate of members of the Plantae and Protista Kingdoms of FIG. 1 according to an embodiment of the invention.

Referring to FIGS. 1-5, in which FIG. 1 is a top perspective view of a combined strobe and grow light system according to one embodiment of the invention, FIG. 2 is a top plan view of the combined strobe and grow light system of FIG. 1, FIG. 3 is a bottom plan view thereof, FIG. 4 is a right side elevational view thereof, and FIG. 5 is a front elevational view thereof, various embodiments of a combined strobe and grow light system 100 are shown.

The combined strobe and grow light system 100 may include a main body 102, a strobe assembly 104, a grow light 106, an electrical connector 108, and an integrated lighting control system 110. The combined strobe and grow light system 100 may be configured to work in concert with one or more combined strobe and grow light systems 100 that may be arranged in various configurations relative to one another and relative to one or more members of the Plantae and Protista Kingdoms. One of ordinary skill in the art may include any number and configuration of combined strobe and grow light systems 100, as desired.

It should be understood that the main body 102 may be formed using any suitable durable material or combination of materials. In certain embodiments, the main body 102 may be fabricated using a water-resistant material, such as metal or plastic, as non-limiting examples. The main body 102 may include a combination of materials, as desired. The main body 102 may be any suitable shape and size. In certain embodiments, the shape, size, and configuration of the main body 102 may be adjustable by a user, as needed.

The main body 102 may have a front panel 112, a rear panel 114, a top panel 116, a bottom panel 118, and at least one side panel 120, according to certain embodiments. The front panel 112, rear panel 114, top panel 116, bottom panel 118, and at least one side panel 120 may be integral with one another or may be permanently or removably connected to one another using any suitable means such as screws or welding, as non-limiting examples. One or more labels 122 may be disposed on the outer surface 124 of the main body 102. As non-limiting examples, label 122 may include safety information, identifying information, operation instructions, or any other relevant information, as needed.

One or both of the front panel 112 and the rear panel 114 may include the electrical connector 108. In certain embodiments, an electrical socket may be disposed on one or both of the front panel 112 and the rear panel 114. Alternatively, an electrical plug may be disposed on one or both of the front panel 112 and the rear panel 114. A cable connector may also be used, as another non-limiting example, as determined by one of skill in the art. It should be understood that the electrical connector 108 may be disposed on or connected to any part of the main body 102, as desired.

According to one more particular embodiment, an electrical connector 108 disposed on a front panel 112 of a first combined strobe and grow light system 100 may be adapted to form an electrical connection with an electrical connector 108 disposed on a rear panel 114 of a second combined strobe and grow light system 100. In an alternative embodiment, the first and second combined strobe and grow light systems 100 may include identical electrical connectors 108 on the front panels 112 and the rear panels 114, and an electrical cord may be used to form an electrical connection between the first and second combined strobe and grow light systems 100. In yet another embodiment, an electrical cord may extend from one of the front and rear panels 112, 114 of the first combined strobe and grow light system 100 and may be adapted to plug into a wall socket and/or a socket disposed on the second combined strobe and grow light system 100. A skilled artisan may electrically connect any desired number and configuration of combined strobe and grow light systems 100.

At least one end panel 112 may include one or more vent holes 126 or any other suitable ventilation mechanism adapted to permit airflow in and out of the main body 102, as needed. In addition, vent holes 126 may be included to prevent moisture from damaging electrical components housed within the main body 102 of the combined strobe and grow light system 100. According to certain embodiments, the vent holes 126 may be integral to the main body 102. According to certain alternative embodiments, independent ventilation mechanisms, such as screws or snap-fit vents (not shown), may be permanently or removably attached to the outer surface 124 of the main body 102. A skilled artisan may select any suitable type, size, and number of vent holes 126 or other ventilation mechanisms, as desired.

The strobe assembly 104 may be disposed in, permanently or removably connected to, or otherwise affixed to the bottom panel 118 of the main body 102. The strobe assembly 104 may extend outwardly away from the bottom panel 118 of the main body 102, as determined by one of skill in the art. In certain embodiments, one or more strobe assembly 104 may be connected to one or more of the front panels 112, rear panel 114, top panel 116, bottom panel 118, and at least one side panel 120. A skilled artisan may include any number of strobe assemblies 104 in any configuration, as desired.

Figure 6:
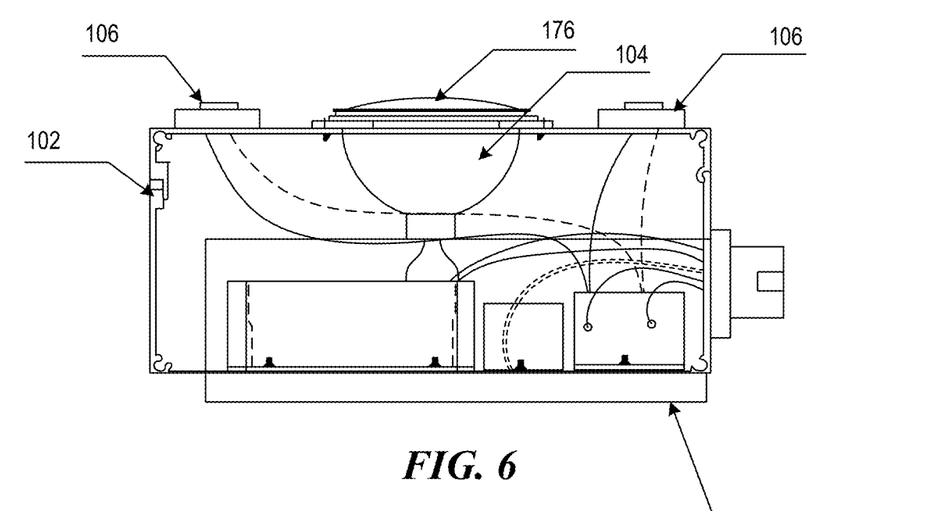
FIG. 6 shows an integrated lighting control system that is adapted to allow the user to control the components of the photon source for promoting the growth and maturation rate of members of the Plantae and Protista Kingdoms according to an embodiment of the invention.
Figure 7:
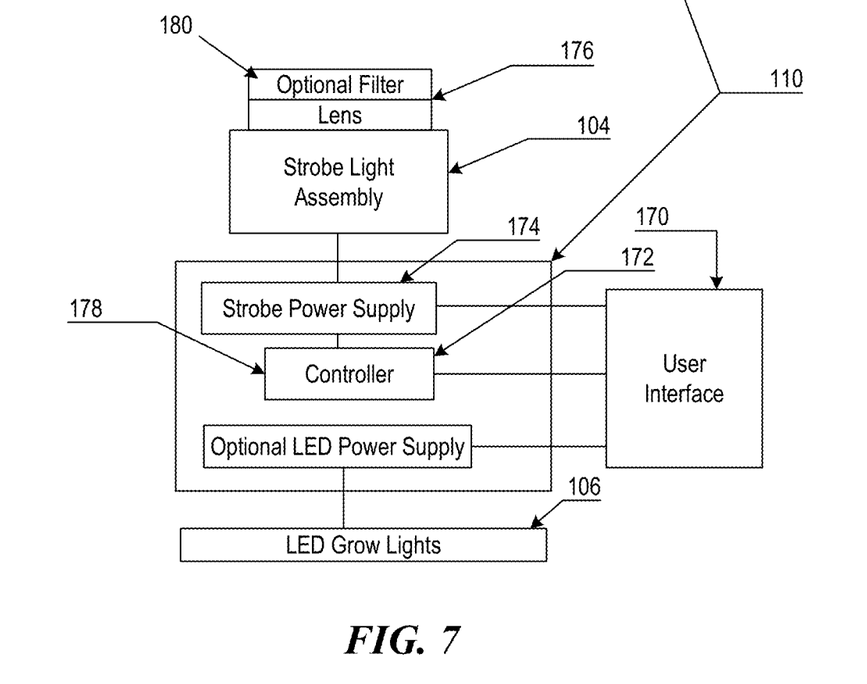
FIG. 7 is a schematic representation of the photon source for promoting the growth and maturation rate of members of the Plantae and Protista Kingdoms according to an embodiment of the invention.

In embodiments, the strobe assembly 104 may include a bulb (not shown) and a lens 176 (see FIGS. 6 and 7). In embodiments, the bulb may have a color light temperature rating of about 5,600 Kelvin. Because a greenhouse environment may be subject to fire, especially where the photon source generates significant heat, it is preferred that the lens 176 should pass 8800 UL testing for flammability. A filter 180 may be selected to help promote the growth and maturation rate of members of the Plantae and Protista Kingdoms, for example by allowing the transmission of photons having wavelengths in the UVA (315-400 nm), UVB (280-315 nm), and IR (700-2200 nm) spectra.

The strobe assembly 104 is selected to provide the desired intensity, frequency, and wavelength of light to one or more members of the Plantae and Protista Kingdoms. The intensity, frequency, and wavelength of the light may be selected based on the specific needs of the species of the plant with which the system is used. Likewise, the strobe assembly 104 may be modified or customized to be used with different species of members of the Plantae and Protista Kingdoms. One of ordinary skill in the art may select the intensity, frequency, and wavelength of the light provided by the strobe assembly 104, as desired. Significantly and uniquely, embodiments of the invention operate the strobe assembly 104 to administer micro-doses of photons to the members of the Plantae and Protista Kingdoms. This aspect of the invention is discussed in greater detail below.

In the embodiments of the invention, the strobe assembly 104 is comprised of the strobed high-intensity light 104 and a lens 176 (see FIGS. 6 and 7). In embodiments of the invention, the strobe assembly 104, without a filter, generates strobed high-intensity light that is greater than about 1,000 PPF (43,478 lumens or 23,625 candela), but less than 20,000 PPF (869,565 lumens or 472,512 candela). In the embodiments of the invention, these numbers can be adjusted using several types of filters 176 over the lens, such as an IR filter which would drop the PPF to 0. The strobe assembly 104 itself still produces the peak PPF, but it is not visible due to the presence of the filter.

In addition to selecting a desired intensity, frequency, and wavelength, the strobe assembly 104 can also be located at alternative distances from the subject plant. The strobe assembly 104 may be located closer to the plant to increase light concentration for the plant. The strobe assembly 104 may likewise be located farther from the plant to decrease light concentration for the plant. Where the strobe assembly 104 is located farther from the plant, it should be appreciated that a single strobe assembly 104 may provide lighting to a broader area and more of the members of the Plantae and Protista Kingdoms, at a lower intensity.

As discussed above, FIG. 2 is a top plan view of the combined strobe and grow light system of FIG. 1, and FIG. 3 is a bottom plan view thereof. The grow light 106 may be disposed in, permanently or removably connected to, or otherwise affixed to the bottom panel 118 of the main body 102. The grow light 106 may extend outwardly away from the bottom panel 118 of the main body 102, as determined by one of skill in the art or it may extend linearly on either side of one or more strobe assembly. In certain embodiments, one or more grow lights 106 may be connected to one or more of the front panels 112, rear panel 114, top panel 116, bottom panel 118, and at least one side panel 120. A skilled artisan may include any number of grow lights 106 in any configuration, as desired.

In a more particular embodiment, the bottom panel 118 of the main body 102 of the combined strobe and grow light system 100 may have the strobe assembly 104 disposed centrally on or extending through the bottom panel 118, as well as a first grow light 128 and a second grow light 130, as shown in FIG. 5, disposed on either side of the strobe assembly 104, as shown in FIGS. 3-5, and positioned on or extending through the bottom panel 118. It should be understood that any number and configuration of strobe assembly 104 and grow lights 106 may be included in the combined strobe and grow light system 100.

In the exemplary photon source, as discussed in greater detail below, any combination of strobe assembly 104 and grow lights 106 may be used. As non-limiting examples, any combination of fluorescent lights, Xenon lights, halogen lights, HPS lights, and LED lights including various colors such as violet, blue, green, and red may be used. In certain embodiments, one or both of the strobe assembly 104 and the grow light 106 may include and/or be capable of displaying more than one type of light or color of light, as desired. For example, the lighting systems may be based in part on those systems described in U.S. Pat. Nos. 6,050,700, 9,295,201, and 9,756,794, which patents are incorporated herein in their entirety by this reference thereto.

FIG. 6 shows an integrated lighting controller and power source 110 that is adapted to allow the user to control the components of the combined strobe and grow light system 100 quickly and easily. The controller and power source 110 may be housed within the main body 102 according to certain embodiments. According to certain alternative embodiments, the controller and power source 110 may be housed remotely and/or disposed on the outer surface 124 (see FIG. 1) of the main body 102, as determined by one of skill in the art. In other embodiments, the controller and power source may be situated at different locations, e.g. the power source may be located within the main body 102 and the controller may be located remotely, etc. The controller may also be embedded into the power source in embodiments of the invention.

FIG. 7 is a schematic representation of the photon source for promoting the growth and maturation rate of members of the Plantae and Protista Kingdoms according to an embodiment of the invention. The lighting control system 110 may include as one non-limiting example, a controller 172 and power source 174. The lighting control system 110 may include or be in communication with other components such as a user interface 170 which may comprise any of a keypad/display or an app on a hand-held or other device, a wireless interface such as a Bluetooth, Wi-Fi, RFID transceiver, etc., a remote control, a timer and/or clock, a visual interface, and a power switch, as non-limiting examples. Additional components configured to control, adjust, and automate the various lighting features of the combined strobe and grow light systems 100 such as dimmers, alarms, and safety features (not shown) may also be included, as desired. In other embodiments, the controller may receive feedback 178 from growth monitoring or other environmental sensors in the greenhouse which may provide signals to operate the photon source adaptively.

In a particular embodiment, the controller 172 comprises a processor for receiving processor-executable instructions. The controller 172 may also include a tangible, non-transitory computer-readable storage medium in which the processor-executable instructions are stored or otherwise embodied. The processor may be in communication with the computer-readable storage medium, for purposes of executing the processor-executable instructed embodied thereon. It should be appreciated that other types of controllers may also be used within the scope of the disclosure.

The controller 172 may also be in communication with at least one sensor (not shown), which may inform the controller when the predetermined cycling time is to begin or end. For example, at least one sensor may be a photosensitive eye or light sensor that detects the presence of a sufficient amount of natural lighting where at least one strobe assembly and/or grow light may be cycled off, or a presence of an insufficient amount of natural lighting where the at least strobe assembly and/or grow light may be cycled on. In other embodiments, at least one sensor measures an absence of a sufficient amount of moisture or water in the plant environment, in which case the exposure to the strobed high-intensity lighting is minimized to militate against an undesirable drying of the plant. Other types of sensors may also be in communication with the controller, as desired.

In operation, the user places the combined strobe and grow light system 100 at a desired location above, next to, or under a plant or group member of the Plantae and Protista Kingdoms. The user may connect any number of combined strobe and grow light systems 100 and place them in any configuration relative to the members of the Plantae and Protista Kingdoms, as desired. The user may then, using the remote, the visual interface, and/or any other input and output devices, activate, deactivate, automate, and otherwise manipulate the strobe assembly 104 and grow light 106, as desired.

Embodiments of the invention include at least one combined strobe and grow light system 100 disposed adjacent to the plant. In certain embodiments, at least one combined strobe and grow light system 100 is suspended above the plant. In some examples, at least one combined strobe and grow light system 100 may be suspended with a non-rigid connector such as a cord, cable, strap, or chain, as non-limiting examples. In other examples, at least one combined strobe and grow light system 100 may be suspended above the plant with a rigid connector such as a bracket. Other suspension means may also be used to dispose the combined strobe and grow light system 100 adjacent to the plant. The combined strobe and grow light system 100 may also be disposed to a side of the plant, or underneath the plant, as desired. Other locations for the combined strobe and grow light system 100 relative to the plant may also be used.

Embodiments of the invention may include a plurality of combined strobe and grow light systems 100 disposed above a plurality of the members of the Plantae and Protista Kingdoms. Each of the combined strobe and grow light systems 100 may be independently operated, or may be operated in unison, as desired. Embodiments of the invention may be employed in a greenhouse, for example, where the members of the Plantae and Protista Kingdoms are being cultivated. Embodiments of the invention may also be employed in other areas where the members of the Plantae and Protista Kingdoms are being cultivated, for example, in an open field in which the combined strobe and grow light system 100 has been deployed. Where the combined strobe and grow light system 100 is used in the open field, the combined strobe and grow light system 100 may be suspended from stakes driven into the ground or hung from a framework disposed over the members of the Plantae and Protista Kingdoms in the field. One of ordinary skill in the art may select alternative means for disposing the combined strobe and grow light system 100 adjacent to the members of the Plantae and Protista Kingdoms, as desired.

For example, the user may program the combined strobe and grow light system 100 to display the strobe assembly 104 for a predetermined period of time each day. The user may also program the number of flashes per second, the light color, and the brightness, as non-limiting examples. According to certain embodiments, the user may have a plurality of predetermined settings programmed using the integrated lighting control system 110. The strobe assembly 104 may function automatically according to predetermined settings and/or the user may manually select settings for the strobe assembly 104, as desired.

Likewise, the grow light 106 may be programmed to be automatically activated during certain times with variable characteristics relating to brightness and light color. For example, the grow light 106 may be turned on to provide ambient light so that the strobe assembly 104 strobing is not visually apparent to the user while the grow light 106 is operating. In another example, the strobe assembly 104 may be turned off while the grow light 106 is turned on. According to certain embodiments, the user may have a plurality of predetermined settings programmed using the integrated lighting control system 110. The grow light 106 may function automatically according to predetermined settings and/or the user may manually select settings for the grow light 106, as desired.

Advantageously, the user can use the strobe assembly 104 and the grow light 106 in concert with one another and/or independently from one another, as desired, using one or any combination of preprogrammed settings, manual settings, and adaptive control. Additionally, optimal plant growth settings may be used to increase and optimize plant and flower production.

A method of growing and inspecting members of the Plantae and Protista Kingdoms using the combined strobe and grow light system 100 includes a first step of providing at least one combined strobe and grow light system 100. A second step includes electrically connecting one or more combined strobe and grow light system 100 to a power source and/or to another combined strobe and grow light system 100. A third step includes positioning the combined strobe and grow light system 100 above, next to, and/or below one or more members of the Plantae and Protista Kingdoms. A fourth step includes activating the strobe assembly 104 and/or the grow light 106 of the combined strobe and grow light system 100.

An additional step may include providing preprogrammed settings or adaptive control for one or both of the strobe assembly 104 and the grow light 106 using the integrated lighting control system 110. Settings may relate to flashing frequency, brightness, color, and timing, as non-limiting examples. Another additional step may include manually controlling one or both of the strobe assembly 104 and the grow light 106, as desired. It should be understood that a skilled artisan may include additional steps in any such method and may perform the steps in any desired order as well as any desired number of times.

Photon Source—Pulsed Xenon Lighting (PXL)

Embodiments of the invention use pulsed xenon lighting (PXL) in combination with a grow light as an enhancer for photosynthetic functions. PXL addresses two markets: growers seeking solutions to rising food insecurities that are coupled with declining crop quality, and growers seeking solutions for lowering their carbon footprint.

PXL addresses the global energy crisis in controlled environment agriculture (CEA) and lowers production costs, increasing plant productivity, yield, and quality while mitigating the carbon footprint associated with conventional lighting technology. PXL also optimizes the use of lighting in CEA where shade coverings are used to reduce environmental heat. The use of pulse lighting reduces the energy required for cooling when high-pressure sodium (HPS) and LED lights source are also employed in the CEA. Due to co-lighting LED and PXL (combining) a lower amount of photons from LED lighting are required. This higher efficiency reduces the energy required for operation and cooling.

In embodiments of the invention, PXL is a new luminous power source that provides the full range of visible light spectra (400-800 nm) by mimicking sunlight in a sunfleck (dappled) pattern by exciting xenon gas inside of an enclosed glass tube in instantaneous pulsed sequences. The pulse penetrates the plant leaf and stems containing chlorophyll, or photon processing Protista, that provide the energy required for growth by enhancing photosynthetic plant functions and greatly reducing production energy consumption. The pulse also allows the plant to process the photosynthesis reaction before the next flash. The pulsed lighting sequences reduce energy consumption by up to 90%, and this makes it an excellent application when operated by solar or wind power (other forms of green energy), thus reducing carbon footprint.

PXL is used as a method for regulating photosynthetic efficiency through epigenetic regulation that includes the use of an electromagnetic spectrum stroboscopic photon source. A method for regulating crop and varietal specific intensity, wavelength, and duration requirements is needed to maximize photosynthetic efficiency, depending on growing location, production schedule, and technique. PXL mimics sunfleck, which increases the plant's photon exposure without the side effect of heat damage. PXL delivers high-intensity pulses with xenon gas. PXL engages photosynthetic pathways which allow for optimized photosynthesis.

Micro-doses of peak performance radiance wavelengths are produced from a stroboscopic photon source that simulates the wind-induced dappling effect of sunlight under a tree canopy, known as sunfleck. Sunflecks account for as much as 80% of the photons that reach members of the Plantae and Protista Kingdoms in the understory, and up to 35% of carbon fixation. The stroboscopic photon source is used to provide peak-performance photons to a leaf canopy in a greenhouse, shade house, hoop house, Quonset, or controlled environmental agriculture system, for up to 24 hours/per day. The stroboscopic photon source initiates, stabilizes, and regulates steady-state photosynthetic induction and relaxation through light modulation, allowing for maximized efficiency and robust expression of genes controlling qualitative and quantitative phenotypic traits. The photon source allows for control, regulation, and modification of phenotypic expression in members of the Plantae and Protista Kingdoms, including root development, internode spacing, branching development, flower set, early maturing, yield increases, phenolic compound increases, and quality enhancements both qualitatively and quantitatively.

The pulsed stroboscopic photon source uses Xenon, Krypton, or inert gasses inside a glass tube, with or without a filter, to create an instantaneous reaction with peak photon performance. The photon source has an electromagnetic spectrum range from 50 nm-2200 nm. Sunfleck micro-dosing occurs when the stroboscopic photon source pulses in random or synchronized sequences and photons are delivered to the surface of the leaf canopies where the source can be adjusted by height increments.

Each pulse cycle or exposure time consists of an energy trigger pulse, the flash where instantaneous PPF is reached, and a decay period where PPF returns to zero. The energy trigger pulse initiates the ionization of the inert gas with a pulse width of 10 μsec to 350 μsec for a strobe light with an input of 3 to 400 watts (W) and an output of 450 to 8,500 watts (W) in peak radiant flux, which includes the light produced in the visible and electromagnetic spectrum (Red, Far-Red, IR, Green, Blue, UVA. UVB). The initial flash period is defined as the time from trigger to the point after peak PPF that is 50% of PPF and a decay period that is two to seven times the length of the flash period.

To enhance the sunfleck effect, micro-dosing micro-burst flashes can be added into the decay period of the pulse cycle where the initial primary flash (Pf), which is defined as the flash having the highest PPF, is followed by one or more additional micro-burst flashes (Af), each having a lower PPF. For example, 80 primary flashes (Pf) become 160 flashes when one micro-burst flash (Af) is added to each primary flash (Pf), 240 flashes when two micro-burst flashes (Af) are added is added to each primary flash (Pf), 320 flashes when three micro-burst flashes (Af) are added to each primary flash (Pf), etc. The number of micro-burst flashes within the pulse cycle can be between one and eight. In other cases, the flash process sequence can be reversed or randomized where a blend of all flashes occurs within a total pulse cycle.

The photon source can be installed where multiple fixtures are having pulsed beam overlap that provides a variety of densities and adds to total light output, intensity, and watts. The photon source can have open sides to the fixture to supply peak performance photons to vertical leaf canopies (leaf wall). The photon source provides a low-heat light source for use in controlled-environment agriculture (CEA). The photon source provides a low energy use light source for use in controlled-environment agriculture (CEA). The photon source provides the electromagnetic spectrum needed for activation and maximized symbiosis of the Microorganisms (endophytes) within the plant and photosynthetic functions of the plant or Protista. The photon source provides the electromagnetic spectrum needed for the activation of photoreceptors that transition between states absorbing red light (Pr) and far-red light (Pfr), thus expanding the spectral range of optogenetics to the near-infrared range. The photon source provides the visible electromagnetic spectrum captured by chlorophylls, carotenoids, flavins, pterins, anthocyanins, bilins, and others within an organism (endophytes) located inside the plant. The photon source uses light modulation to influence quorum sensing versatile chemical signaling molecules called autoinducers, which regulate gene expression.

Embodiments of the invention provide a method for regulating photosynthetic efficiency through epigenetic regulation that includes the use of an electromagnetic spectrum stroboscopic photon source that produces intense pulsed light occurrences.

Embodiments of the invention provide a method for regulating crop and varietal-specific intensity, wavelength, and duration requirements needed to maximize photosynthetic efficiency, depending on growing location, production schedule, and technique.

In embodiments of the invention, the stroboscopic photon source initiates, stabilizes, and regulates steady-state photosynthetic induction and relaxation through light modulation, allowing for maximized photosynthetic efficiency and robust expression of genes controlling qualitative and quantitative phenotypic traits. The photon source allows for control, regulation, and modification of phenotypic expression in members of the Plantae and Protista Kingdoms, including root development, internode spacing, branching development, flower set, early maturing, yield increases, phenolic compound increases, and quality enhancements both qualitatively and quantitatively.

In embodiments of the invention, the pulsed stroboscopic photon source uses Xenon, Krypton, or inert gasses inside a glass or quartz tube, with or without a filter, to generate intense pulsed photon events through an instantaneous reaction with peak performance, producing micro-doses of intense light. In embodiments of the invention, the photon source has an electromagnetic spectrum range from 50 nm-2200 nm (defined as 50 to 350 UV, 400 to 700 visible, 700 to 800 far red, 800 to 2200 infrared).

In embodiments of the invention micro-doses of peak performance electromagnetic spectrum radiance wavelengths are produced from a stroboscopic photon source that simulates the wind-induced dappling effect of sunlight under a tree canopy, known as sunfleck. In embodiments of the invention, the photon source pulses in random or synchronized sequences in short, micro-dosing exposure times, from 0.01 milliseconds to 10 milliseconds per flash. In embodiments of the invention, the photon source delivers 13,754.5 $\mu mol/s^{-1}$ peak PPF instantaneous photons at one meter. In embodiments of the invention, the photon source delivers $17.55 \times 10^{21}$ photons per square meter at one meter. In embodiments of the invention, a photon source has a PPF instantaneous efficiency of 333.43 PPF/W (strobe assembly fixture) at one meter.

In embodiments of the invention, the photon source is a point source focused intense light source that delivers 533.390-88,348.78 range of instantaneous PPFD to the surface of the leaf canopies when the source is adjusted by height increments from seven feet to one foot. This data pertains an exemplary embodiment of the invention. Those skilled in the art will appreciate that this value varies for different fixtures, etc.

In embodiments of the invention, the stroboscopic photon source is used to provide peak-performance photons to a leaf canopy in environmental agriculture systems, for up to 24 hours/per day. The point source lens allows for the photon source to be installed and arranged to where multiple fixtures have pulsed beam overlap that provides a variety of densities and adds to total light output, intensity, and watts. In embodiments of the invention, the photon source can have open sides to the fixture allowing for up to 360 degrees of peak-performance photons to vertical leaf canopies (leaf wall).

The photon source provides a low-heat light source for use in controlled-environment agriculture (CEA). The photon source provides a low energy use light source for use in controlled-environment agriculture (CEA).

Figure 8:
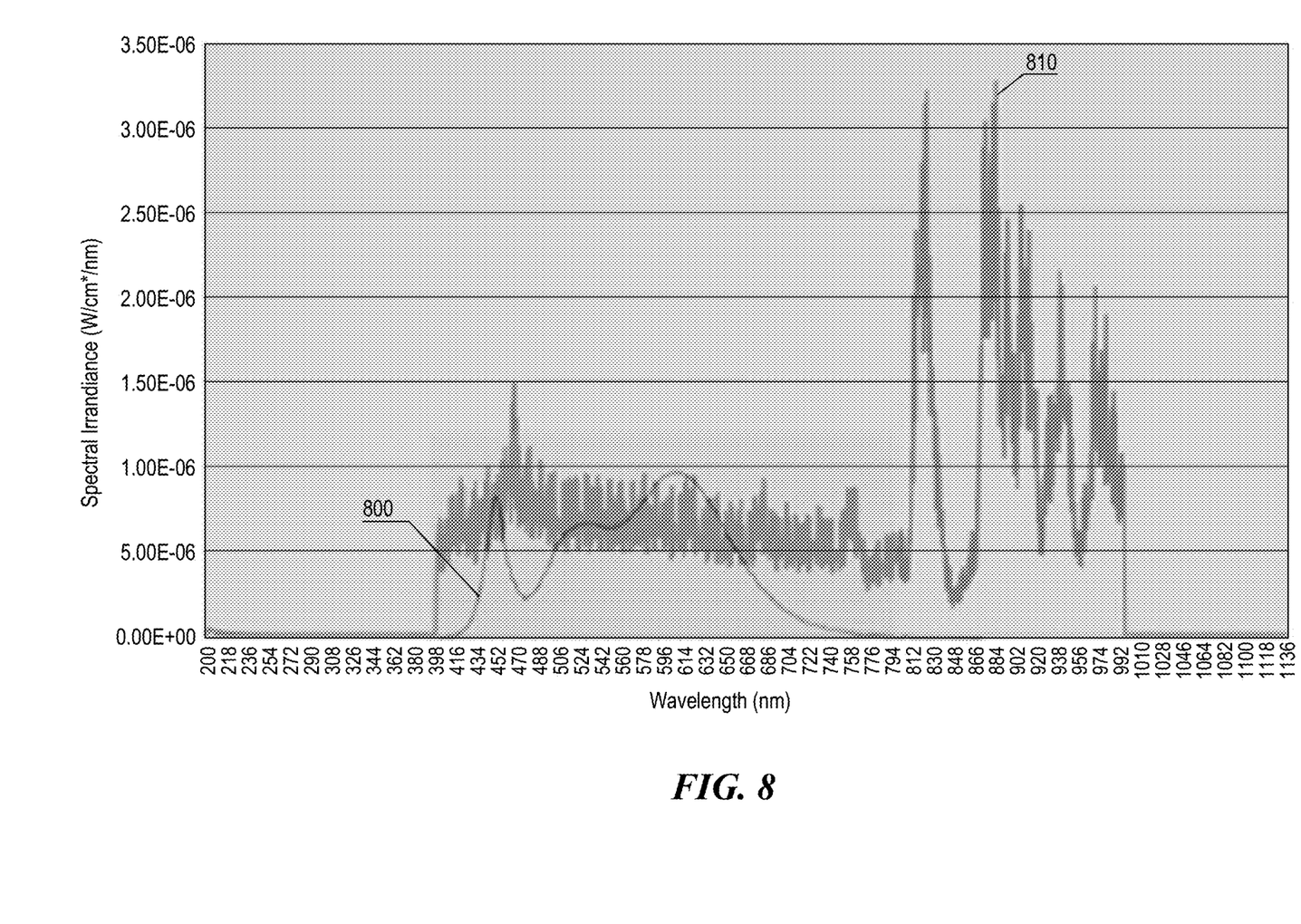
FIG. 8 is a graph showing an exemplary electromagnetic spectrum produced by a grow light superimposed over the spectrum of photons produced by the photon source.

Embodiments of the invention combine a photon source and grow light. FIG. 8 is a graph showing the electromagnetic spectrum for light produced by the grow light 800 superimposed over the spectrum of photons produced by the photo source 810. In FIG. 8, the grow light provides a near-constant source of illumination to the plant at lower wavelengths (~400-800 nm) while the photon source provides micro-doses of pulsed light at higher wavelengths (~400-1010 nm and, most particularly, from 812-1010 nm). In embodiments of the invention, the grow light provides the light required for growth in a low-light or no-light environment. The strobe optimizes the light provided to the members of the Plantae and Protista Kingdoms whether the light is provided from the sun or from grow lights.

EXAMPLES

Example 1

A stroboscopic growing light with a peak performance peak-to-time average ratio of 2424.5, where the peak-to-time average ratio is the ratio between the photosynthetic photo flux density (PPFD) over the span of a second and the peak PPFD measured instantaneously.

A Flashes per minute: 1-550 flashes per minute@ 50-60 Hz. In embodiments of the invention the photon source is flashing at 1.3 milliseconds; in 24 hours the members of the Plantae and Protista Kingdoms are only exposed to about 2.496 minutes of light.

B. Input voltage of fixtures may be alternating current (AC) or direct current (DC).

C. Wattage: 30 Watts in an exemplary strobe assembly embodiment of the invention. Adjusting this value affects time to average ratio, e.g. within a range of 3-75 watts, the selected value affects the time to average through intensity output and PPFD.

D. A micro-dose of light with a flash duration of 1.3 milliseconds. Adjusting this number affects time to average ratio, e.g. within a range of 0.01-10 milliseconds, the selected value affects the time to average through longer flash and increases the PPFD average over a second decreasing the instantaneous PPFD over a second, thus lowering the time to average during a second.

E. Light recipes can be adjusted by one skilled in the art depending on lighting requirements and desired outcome.

Examples of varying numbers of sequential flashes of the same intensity:
A flash of 1.5 milliseconds with an off period of 750 milliseconds resulting in approximately 80 flashes per minute.
A primary flash (Pf) of 0.75 milliseconds with a secondary flash (Af) of 0.75 milliseconds with an off period of 750 milliseconds resulting in approximately 160 flashes per minute.
A primary flash (Pf) of 0.5 milliseconds with a secondary flash (Af) of 0.5 milliseconds a third flash (Af) of 0.5 milliseconds with an off period of 750 milliseconds with an off period of 750 milliseconds resulting in approximately 240 flashes per minute.
A primary flash (Pf) of 0.375 milliseconds with a secondary flash (Af) of 0.375 milliseconds, a third flash (Af) of 0.375 milliseconds a 4th flash (Af) of 0.375 milliseconds with an off period of 750 milliseconds resulting in approximately 320 flashes per minute.

Examples of varying numbers of sequential flashes with each flash diminishing in intensity:
A flash of 1.5 milliseconds with an off period of 750 milliseconds resulting in approximately 80 flashes per minute.
A primary (Pf) 60-watt flash of 0.75 milliseconds with a secondary (Af) 30-watt flash of 0.75 milliseconds with an off period of 750 milliseconds resulting in approximately 160 flashes per minute.
A primary (Pf) 60-watt flash of 0.5 milliseconds with a secondary (Af) 30-watt flash of 0.5 milliseconds a third (Af) 15-watt flash of 0.5 milliseconds with an off period of 750 milliseconds resulting in approximately 240 flashes per minute.
A primary (Pf) 60-watt flash of 0.375 milliseconds with a secondary (Af) 30-watt flash of 0.375 milliseconds a third (Af) 15-watt flash of 0.375 milliseconds a 4th (Af) 7.5-watt flash of 0.375 milliseconds with an off period of 750 milliseconds resulting in approximately 320 flashes per minute.

Examples of varying off periods in between flashes:
A flash of 1.5 milliseconds with an off period of 375 milliseconds resulting in approximately 160 flashes per minute.
A flash of 1.5 milliseconds with an off period of 250 milliseconds resulting in approximately 240 flashes per minute.
A flash of 1.5 milliseconds with an off period of 187.5 milliseconds resulting in approximately 320 flashes per minute.

Flashes could also be randomized to vary the intensity and frequency of flashes.

F. A lens type on the bulb is polycarbonate. Because an IR filter can be added to remove PPFD, there is no time to average to measure.

G. Xenon gas in the bulb, or any inert gas such as krypton or any gas that can provide a spectrum similar to the sun.

H. Instantaneous peak-to-time mimics sunfleck or dappled lighting.

I. Little to no production heat due to instantaneous power, and low wattage.

J. With or without an LED grow light for additional PPFD.

When the strobe assembly is supplemented with LED, fluorescent, HPS, or other grow light sources, with the strobe assembly in a dark room, the members of the Plantae and Protista Kingdoms grow. Adding the LED to the strobe increases the continuous PPFD of the combined light. The PPFD of the strobe is low on an average, with the LED it remains sufficient for plant growth.

K. Daily light integral (DLI) is the amount of Photosynthetically active radiation (PAR) received each day as a function of light intensity (instantaneous light: $\mu mol \cdot m-2 \cdot s-1$) and duration (day). It is expressed as moles of light (mol) per square meter (m-2) per day (d-1), or: $mol \cdot m-2 \cdot d-1$ (moles per day).

The 30-watt xenon strobe has a daily light integral (DLI) at 4 ft with an average instantaneous PPFD average of 2,933.645 for 24 hours (independent testing facility). The duration of light exposure in a 24-hour period is 2.496 minutes (149.76 seconds) with an instantaneous PPFD average of 2,933.645 µmol/m²/s (438,830.152 µmol/m²).

Convert the units to mol/m²/day: 438,830.152 µmol/m²*(1 mol/1,000,000 µmol)*(60 seconds/1 minute)*(60 minutes/1 hour)*(24 hours/1 day)=18.95 mol/m²/day of DLI.

With an instantaneous PPFD of 2,933.645 µmol/m²/s at 4 ft provided for 2.496 minutes, the estimated DLI is approximately 18.95 mol/m²/day.

Ideal DLI ranges for different growing different categories of plants are as follows:
1. Low-light plants, e.g. ferns, some tropical foliage plants: DLI Range: 5-10 mol/m²/day;
2. Medium-light plants, e.g. some herbs, leafy greens: DLI Range: 10-20 mol/m²/day;
3. High-light plants, e.g. fruits, vegetables, flowering plants: DLI Range: 20-40+ mol/m²/day.

Example 2

A stroboscopic growing light with high-intensity full spectrum wavelengths with 50% total power coming from IR, 50% coming from visible wavelengths. This is the natural spectrum of a Xenon bulb without a filter. A filter can be added to reduce the amount of IR or visible light that passes through the filter.
A. Wavelength 50 nm to 2200 nm.
B. Point Source Lens type can be adjusted with a filter or a specially manufactured lens material to affect the wavelength provided to members of the Plantae and Protista Kingdoms. An IR filter can be added to the lens that does not allow visible wavelengths to pass through, such that all that the plants receive is IR wavelengths. This can also be done in reverse where all that the plants receive are visible wavelengths. Blue light, red light, and green light filters, etc. can also be used.
C. Bulb type can be adjusted to affect the wavelength provided to members of the Plantae and Protista Kingdoms. For example, changing from glass to quartz modifies the wavelengths slightly, e.g. this removes UV.
D. Unique spectrum only provided by stroboscopic light has an influence on phenotypic expression in members of the Plantae and Protista Kingdoms.
E. UVA and UVB benefits members of the Plantae and Protista Kingdoms by promoting photomorphogenesis, e.g. UVB triggers secondary metabolite production,
F. Far-red and IR benefits members of the Plantae and Protista Kingdoms by penetrating deeper into the leaf strata for photosynthesis, and by triggering flowers through phytochromes.
G. With or without an LED grow light, Example 3

A stroboscopic growing light is used as a method for regulating photosynthetic functions in members of the Plantae and Protista Kingdoms.
A. An enhancer for photosynthetic functions.
B. Mimics sunfleck through light modulation.
C. Affects priming, induction, and relaxation of photosynthetic processes.
D. Pulse influences the circadian rhytm of members of the Plantae and Protista Kingdoms.
E. High-intensity PPFD penetrates entire leaf strata.
F. Little to no production heat due to instantaneous power allows for exposure to high PPFD.
G. Light modulation affects quorum sensing and the microorganisms within a plant, i.e. the photon source uses light modulation to influence quorum sensing versatile chemical signaling molecules called autoinducers, which regulate gene expression. This is how cells talk to each other using autoinducers.
H. Light modulation affects ATP production.
I. With or without an LED grow light for added benefits.
J. Specific duty cycles that are crop/varietal specific for ideal light exposure. For example, Cannabis can be grown with an LED indoors: 24 hours with an LED and a strobe at seedling stage, 24 hours with an LED and a strobe at veg 1 stage, 18 hours with an LED and 24 hours with a strobe at veg 2, 12 hours with an LED and a strobe during flowering through harvest. Tomatoes can be grown without an LED in a greenhouse, 24 hours during seedling, and vegetative, 18 hours during flower through harvest. Varietal type, geographical location, time of year, and production system will dictate lighting cycles.

As used herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. Apparatus for regulating photosynthetic efficiency in members of the Plantae and Protista Kingdoms, comprising:
an electromagnetic spectrum stroboscopic photon source adapted to be positioned proximate to said members of the Plantae and Protista Kingdoms, said stroboscopic photon source producing a plurality of micro-doses of intense pulsed light in random or synchronized sequences, each micro-dose having an exposure time from about 0.01 milliseconds to about 10 milliseconds within an electromagnetic spectrum range from about 50 nm to about 2200 nm;
wherein each micro-dose comprises a pulse cycle comprising an energy trigger pulse, a flash in which instantaneous PPF is reached, and a decay period where PPF returns to zero;

wherein the energy trigger pulse initiates ionization of inert gas within said stroboscopic photon source with a trigger pulse width of 10 μsec to 350 μsec for a strobe light with an input of 3 to 400 watts and an output of 450 to 8,500 watts in peak radiant flux, which includes light produced in the visible and electromagnetic spectrum (Red, Far-Red, IR, Green, Blue, UVA, UVB);

wherein said decay period comprises two to seven times the length of the flash period; and wherein said stroboscopic photon source has a peak performance peak-to-time average ratio of between 50-8000 for a 30-watt strobe assembly, where the peak-to-time average ratio is the ratio between the photosynthetic photo flux density (PPFD) over the span of a second and the peak PPFD measured instantaneously.

2. The apparatus of claim 1, wherein a flash period comprises a time from trigger to a point after peak PPF substantially comprising 50% of PPF.

3. The apparatus of claim 1, further comprising:
said stroboscopic photon source producing said micro-doses of intense pulsed light, said micro-doses of intense pulsed light initiating, stabilizing, and regulating steady-state photosynthetic induction and relaxation in said members of the Plantae and Protista Kingdoms.

4. The apparatus of claim 1, further comprising:
said stroboscopic photon source producing 1-550 flashes per minute at between 50 and 60 Hz.

5. The apparatus of claim 1, further comprising:
said stroboscopic photon source having a 3-400-watt strobe light input.

6. The apparatus of claim 1, further comprising:
said stroboscopic photon source producing an exposure time of 0.01-10 milliseconds for a 30-watt strobe assembly.

7. The apparatus of claim 1, further comprising:
said stroboscopic photon source comprising a filter;
wherein said filter type is selected to affect a wavelength of light provided to said members of the Plantae and Protista Kingdoms.

8. The apparatus of claim 1, further comprising:
an LED or other grow lights including any of HPS, HID LPS, fluorescent, or Incandescent.

9. The apparatus of claim 1, further comprising:
said stroboscopic photon source producing light having high-intensity full spectrum wavelengths with 1%-75% total power from IR and 1%-90% total power from visible wavelengths, and up to 5% combined total from UVA and UVB.

10. Apparatus for inducing photosynthetic efficiency in members of the Plantae and Protista Kingdoms, comprising:
an electromagnetic spectrum stroboscopic inert gas photon source adapted to be positioned proximate to said members of the Plantae and Protista Kingdoms, said stroboscopic inert gas photon source producing a plurality of micro-doses of intense pulsed light in random or synchronized sequences, each micro-dose having an exposure time from about 0.01 milliseconds to about 10 milliseconds within an electromagnetic spectrum range from about 50 nm to about 2200 nm;

wherein each micro-dose comprises a pulse cycle comprising an energy trigger pulse, a flash in which instantaneous PPF is reached, and a decay period where PPF returns to zero;

wherein the energy trigger pulse initiates ionization of inert gas within said inert gas stroboscopic photon source with a trigger pulse width of 10 μsec to 350 μsec for an inert gas strobe light with an input of 3 to 400 watts and an output of 450 to 8,500 watts in peak radiant flux, which includes light produced in the visible and electromagnetic spectrum (Red, Far-Red, IR, Green, Blue, UVA, UVB); and wherein said stroboscopic photon source has a peak performance peak-to-time average ratio of 2424.5 for a 30-watt strobe assembly, where the peak-to-time average ratio is the ratio between the photosynthetic photo flux density (PPFD) over the span of a second and the peak PPFD measured instantaneously.

11. The apparatus of claim 1, further comprising:
said stroboscopic photon source producing 80 flashes per minute at between 50 and 60 Hz.

12. The apparatus of claim 1, further comprising:
said stroboscopic photon source having a 30-watt strobe light input.

13. The apparatus of claim 1, further comprising:
said stroboscopic photon source producing an exposure time of 1.30 milliseconds for a 30-watt strobe assembly.

14. The apparatus of claim 1, further comprising:
said stroboscopic photon source producing said micro-doses of intense pulsed light, said micro-doses of intense pulsed light maximizing photosynthetic efficiency and robust expression of genes controlling qualitative and quantitative phenotypic traits in said members of the Plantae and Protista Kingdoms.

15. The apparatus of claim 1, further comprising:
said stroboscopic photon source producing said micro-doses of intense pulsed light, said micro-doses of intense pulsed light affecting control, regulation, and modification of phenotypic expression in members of the Plantae and Protista Kingdoms, including root development, internode spacing, branching development, flower set, early maturing, yield increases, phenolic compound increases, and quality enhancements both qualitatively and quantitatively.

16. The apparatus of claim 1, further comprising:
said stroboscopic photon source producing said micro-doses of intense pulsed light, said micro-doses of intense pulsed light activating photoreceptors that influence optogenetics and maximizing symbiosis of microorganisms (endophyte) within members of the Plantae and Protista Kingdoms and photosynthetic functions of the members of the Plantae and Protista Kingdoms.

* * * * *